J. C. Milligan,
Biscuit Pan.
No. 96,605.    Patented Nov. 9, 1869.
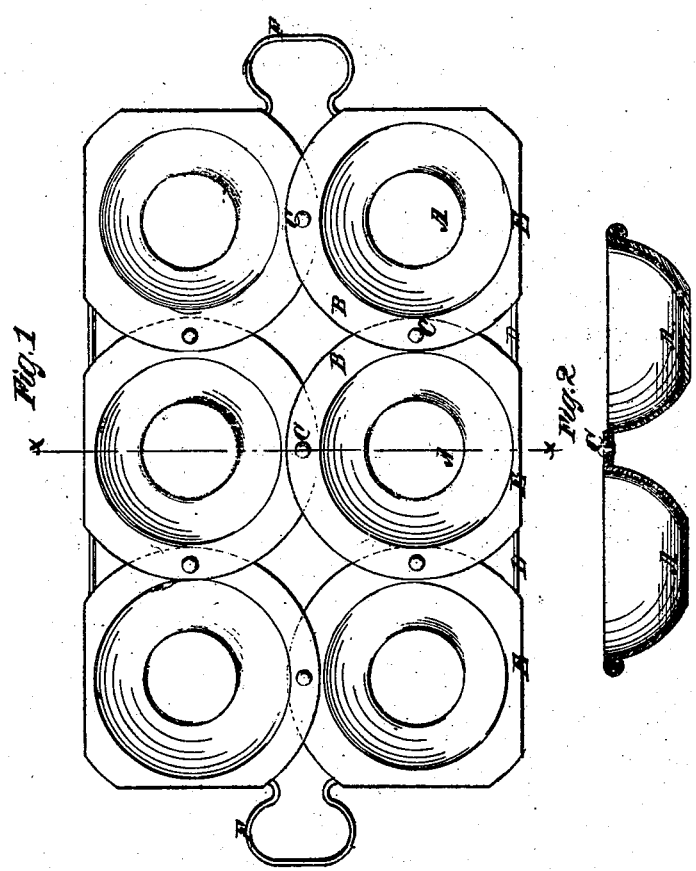

United States Patent Office.

JOHN C. MILLIGAN, OF BROOKLYN, NEW YORK.

Letters Patent No. 96,605, dated November 9, 1869.

IMPROVED BISCUIT-PAN.

The Schedule referred to in these Letters Patent and making part of the same.

To all whom it may concern:

Be it known that I, JOHN C. MILLIGAN, of Brooklyn, in the county of Kings, and State of New York, have invented a new and useful Improvement in Biscuit-Pans; and I do hereby declare that the following is a full, clear, and exact description thereof, which will enable others skilled in the art to make and use the same, reference being had to the accompanying drawings, forming part of this specification.

This invention relates to an improved mode of uniting small biscuit-pans together in clusters; and consists in providing the said pans with horizontal flanges around the tops, and joining them together in rows by lapping the flanges and riveting them, joining two or more rows together, either in right lines in both directions, or in zigzag lines, as may be preferred.

The invention also consists in binding the whole together by wires or other bars, extending around or along the sides of the clusters at the outer edges of the outer pans, and turning the edges of the flanges over them.

Figure 1 represents a plan view of a cluster of pans, constructed according to my improvement, and Figure 2 represents a transverse section on the line x x.

Similar letters of reference indicate corresponding parts.

A represents the pans made of sheet-metal in dies by striking up, generally of round form, and according to my improvement, with wide flanges, B, which I make use of for connecting the pans together in clusters by lapping the said flanges, as shown at C, and riveting them together, as many as may be required, in any preferred order of arrangement, either in right lines in both directions, or in any other lines. I also connect the outer edges of the outer rows of pans to strengthening-wires or other strips or bars of metal, D, by bending the said flanges over them, as represented at E, and I also provide suitable handles, F, for the clusters.

The wires or other strips at the edges may be dispensed with if preferred in some cases, when the metal of the flanges is sufficiently thick and strong, and I contemplate making these clusters either with or without the said wires or bars.

Having thus described my invention,

I claim as new, and desire to secure, by Letters Patent—

Biscuit-pans united in clusters, by lapping and riveting the flanges, and either provided with the stiffening-wires or bars at the edges, or not, substantially as specified.

The above specification of my invention signed by me, this 27th day of September, 1869.

JNO. C. MILLIGAN.

Witnesses:
GEO. W. MABEE,
ALEX. F. ROBERTS.